United States Patent [19]
Morio et al.

[11] 3,873,846
[45] Mar. 25, 1975

[54] POWER SUPPLY SYSTEM

[75] Inventors: Minoru Morio, Kamakura; Fumio Otaki, Yokohama, both of Japan

[73] Assignee: Sony Corporation, Tokyo, Japan

[22] Filed: Aug. 29, 1973

[21] Appl. No.: 392,412

[30] Foreign Application Priority Data
Sept. 7, 1972 Japan.............................. 47-104703
Sept. 7, 1972 Japan.............................. 47-105820
Sept. 7, 1972 Japan.............................. 47-107959

[52] U.S. Cl.............. 307/23, 178/DIG. 11, 307/66, 307/80, 307/82, 320/59, 321/2, 321/27 R, 321/45 S
[51] Int. Cl. ............................................. H02m 1/10
[58] Field of Search ........ 321/2, 4, 8 R, 27 R, 45 S; 307/11, 22, 23, 29, 38, 64, 66, 72, 73, 80, 82; 315/27 TD; 178/DIG. 11; 320/57, 59, 60

[56] References Cited
UNITED STATES PATENTS

| | | | |
|---|---|---|---|
| 2,471,993 | 5/1949 | Woolley................................ | 321/2 |
| 3,049,591 | 8/1962 | Voige..................................... | 307/66 |
| 3,089,071 | 5/1963 | Hartnig.................................. | 307/66 |
| 3,234,450 | 2/1966 | Jennings ................................ | 321/2 |
| 3,473,040 | 10/1969 | Cominassi et al...................... | 321/2 |
| 3,769,571 | 10/1973 | Wilkinson ......................... | 321/27 R |
| 3,771,040 | 11/1973 | Fletcher et al........................ | 321/2 |

FOREIGN PATENTS OR APPLICATIONS
3,490 1/1971 Japan........................... 178/DIG. 11
1,174,721 12/1969 United Kingdom......... 178/DIG. 11

*Primary Examiner*—William H. Beha, Jr.
*Attorney, Agent, or Firm*—Lewis H. Eslinger; Alvin Sinderbrand

[57] ABSTRACT

A DC power supply circuit of the switching or chopping type for converting a voltage from an AC power source or from a DC power source into a predetermined DC voltage and supplying the converted DC voltage to a load, comprises a converting transformer having first and second primary windings and a secondary winding and first and second switching circuits connected to the first and second primary windings, respectively, and being selectively operated for switching or chopping the voltage applied from the AC or DC power source to the respective primary winding thereby to produce a pulse voltage at the secondary winding of the converting transformer to which a rectifier circuit is connected. The converted DC voltage obtained at the output of the rectifier circuit is connected. The converted DC voltage obtained at the output of the rectifier circuit is compared with a reference voltage, and the switching circuits are controlled on the basis of such comparison for maintaining the converted DC voltage at a predetermined level.

20 Claims, 5 Drawing Figures

3,873,846

POWER SUPPLY SYSTEM

BACKGROUND OF THE INVENTION

1. Field of the Invention

This invention relates generally to a power supply system, and more particularly is directed to an improved power supply circuit for applying to a load a predetermined DC voltage from either an AC or DC power source.

2. Description of the Prior Art.

Power supply circuits have been proposed which can use either an AC power source, such as a commercial AC line and the like, or a DC power source, such as a battery and the like.

In such conventional power supply circuits, when an AC power source is used, its AC voltage is lowered to a predetermined AC voltage by means of a transformer and then the AC voltage is rectified to provide the DC voltage to be supplied to a load circuit. On the other hand, when a DC power source is used, the DC voltage from the DC power source is usually supplied directly to the load circuit. Accordingly, it is rather difficult to use such a conventional power supply circuit for appliances, such as a television receiver and so on, which requires an operating voltage which is lower than that of the AC power source but higher than that of the DC power source.

Further, in the existing power supply circuit, the transformer acts on an AC signal to the power frequency, for example, 60Hz, so that the transformer has to be of large size.

In general, the existing power supply circuits employ a series type regulator to stabilize the output voltage so that an undesirably large power loss is experienced.

SUMMARY OF THE INVENTION

According to the present invention, a power supply circuit is provided with a switching circuit for an AC power source and a switching circuit for a DC power source, which switching circuits are connected to respective primary windings of a transformer having a secondary winding for supplying an operating voltage to a load circuit. Each of the switching circuits includes a switching transistor which is controlled in its on-duration in accordance with the magnitude or amplitude of the voltage applied to the load circuit so as to maintain such voltage at a predetermined level.

It is an object of this invention to provide an improved power supply circuit which selectively converts an AC voltage and a DC voltage to a predetermined DC voltage.

Another object of this invention is to provide a power supply circuit of the switching or chopping type which produces a stabilized DC voltage from either an AC source or a DC source by using two switching circuits in association with a common transformer.

A further object of this invention is to provide a power supply circuit, as aforesaid, in which the required transformer may be relatively small.

The above, and other objects, features and advantages of the present invention, will become apparent from the following description which is to be read in conjunction with the accompanying drawings.

DESCRIPTION OF THE PREFERRED EMBODIMENTS

Figure 1:
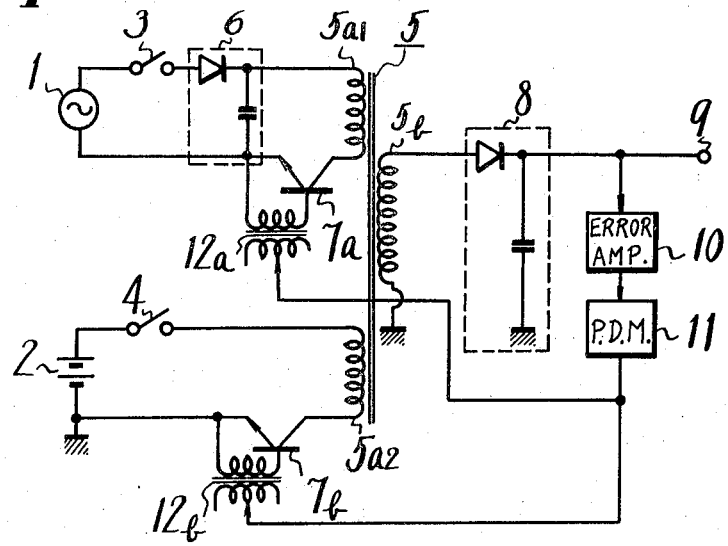
FIG. 1 is a circuit diagram showing the principal components of a power supply circuit according to an embodiment of this invention.

Referring to the drawings in detail, and initially to FIG. 1 thereof, it will be seen that reference numeral 1 designates an AC power source such as a commercial AC line or the like providing, for example, AC 120 volts. One side of AC power source 1 is connected through a power switch 3, a rectifier circuit 6 and a first primarin winding $5a_1$ of a converting transformer 5 to the collector electrode of a switching transistor 7a. The other side of AC power source 1 is connected to the emitter electrode of transistor 7a. The positive terminal of a DC power source 2, such as a battery providing for example, DC 12 volts, is connected through a power switch 4 and a second primary winding $5a_2$ of transformer 5 to the collector electrode of a switching transistor 7b, and the negative terminal of DC power source 2 is grounded and also connected to the emitter electrode of transistor 7b.

The primary windings $5a_1$ and $5a_2$ of converting transformer 5 are both wound on a common core of transformer 5, which further has a secondary winding 5b wound on the same core and being isolated from primary winding $5a_1$. One end of secondary winding 5b is connected through a rectifier circuit 8 to an output terminal 9, while the other end of secondary winding 5b is grounded, for example, by being connected to the chassis of an electric apparatus (not shown) with which the power supply circuit is associated.

A DC voltage delivered to output terminal 9 is fed to an error amplifier 10 and the error signal derived from the error amplifier 10 is applied to a pulse duration modulator (P.D.M.) 11. The output pulse from the pulse duration modulator 11, which has a high frequency, for example, 15.75KHz, is fed through driving transformers 12 and 12b across the base and emitter electrodes of transistors 7a and 7b, respectively, so as to effect the switching operation of such transistors.

When the AC power source 1 is used, power switch 3 is closed and the other power switch 4 is opened, so that only transistor 7a performs its switching operation. As a result, a switching current flows through primary winding $5a_1$ of transformer 5, and hence an AC voltage is induced in secondary winding 5b of the transformer. In this case, if the turns ratio of the primary and secondary windings $5a_1$ and 5b is properly selected in accordance with the amplitude of the AC voltage of AC power source 1, a predetermined DC voltage, for example, of 50 volts DC, can be obtained at output terminal 9. The EC voltage from output terminal 9 is compared with a reference voltage from a suitable reference voltage source (not shown) in the error amplifier 10. The duration of the driving pulse generated in the pulse duration modulator 11 is controlled in response to the amplitude of the error signal from error amplifier 10, so that a stabilized DC voltage can be obtained at output terminal 9. If the DC voltage at output terminal 9 increases, the duration of the driving pulses from pulse duration modulator 11 is reduced by the output from error amplifier 10, with the result that the on-duration of transistor 7a is also reduced to lower the voltage induced in the secondary winding 5b of transformer 5 and hence to provide the desired substantially constant DC voltage at the output terminal 9. On the other hand, when the output voltage at output terminal 9 decreases, the duration of the driving pulse from pulse duration modulator 11 is increased by the output from error amplifier 10, so that the on-duration of transistor 7 a is increased to increase the voltage induced in secondary winding 5b of transformer 5. Thus, a substantially constant DC voltage is obtained at output terminal 9. Since the power switch 4 is opened when the AC power source 1 is used, the transistor 7b does not perform its switching operation.

However, when the DC power source 2 is used, power switch 4 is closed and the other power switch 3 is opened. Therefore, the transitor 7b performs its switching operation, and hence a switching current flows through primary winding $5a_2$ for inducing an AC voltage in the secondary winding 5b. In this case, if the turns ratio of primary winding $5a_2$ and secondary winding 5b is selected properly, a DC voltage of, for example, 50 volts, which is higher than the 12 volts of the DC power source 2, can be obtained at output terminal 9.

As before, when the DC power source 2 is used, the onduration of the transistor 7b is controlled through error amplifier 10 and pulse duration modulator 11 in accordance with the DC voltage obtained at the output terminal 9 and hence a stabilized predetermined DC voltage, for example, a DC voltage of 50 volts, can be obtained at the output terminal 9. In this case, since power switch 3 is opened, transistor 7a does not perform its switching operation.

As may be apparent from the above description, with the circuit shown in FIG. 1, a stabilized predetermined DC voltage can be obtained from either an AC or DC power source.

Further, since the primary winding $5a_1$ of the transformer which is electrically connected to the AC power source 1 and the secondary winding 5b connected, at one end, to the grounded chassis are electrically isolated with each other, and since the driving pulse is applied to transistor 7a through the driving transformer 12a, there is no danger of shock to an operator when he contacts the chassis. It will also be noted that, since the transistors 7a and 7b are switched at high frequency, the converting transformer 5 can be of relatively small size.

Figure 2:
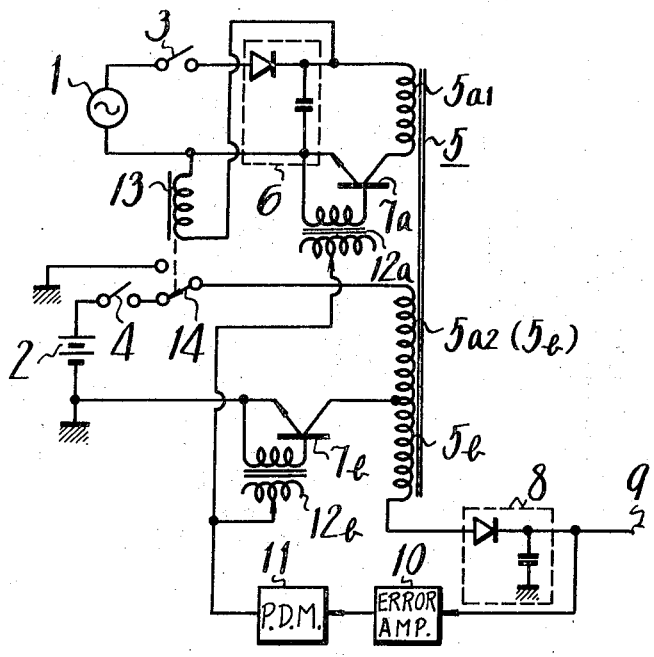
FIG. 2 shows another embodiment of this invention.

FIG. 2 shows a practical embodiment of this invention in which the elements corresponding to those illustrated in FIG. 1 are identified by the same reference numerals.

The embodiment of FIG. 2 is similar to that of FIG. 1 in fundamental construction and operation, with the exception that, in FIG. 2, the secondary winding 5b and the primary winding $5a_2$ of transformer 5 are formed as parts of a common winding, that is, the turns of winding $5a_2$ form part of winding 5b. Fuether the cold end of primary winding $5a_2$, which is also the cold end of the secondary winding 5b, is selectively connected to the positive electrode of DC power source 2 or grounded by a selector switch 14. It will also be seen that in the embodiment of FIG. 2, a relay 13 is connected to the output side of rectifier circuit 6 and is operative to actuate or change-over the selector switch 14.

The operation of the embodiment shown in FIG. 2 will be now described. When AC power source 1 is used, power switch 3 is closed to make transistor 7a perform its switching operation, while switch 4 is, of course, opened. At this time, a current flows through the winding of the relay 13, so that selector switch 14 is changed-over to connect its movable contact to ground. As a result, the cold end of secondary winding 5b is grounded and a predetermined DC voltage is delivered to output terminal 9.

When using the DC power source 2, power switch 3 is opened so that no current flows through the winding of relay 13. Accordingly, the movable contact of selector switch 14 is disposed for connection to the DC power source 2, as shown in FIG. 2. Then, power switch 4 is closed to make transistor 7b perform its switching operation. Accordingly, a predetermined DC voltage is again obtained at the output terminal 9.

In the power supply circuit shown in FIG. 2, since the secondary winding 5b and the primary winding $5a_2$ of the converting transformer 5 have turns thereof in common, converting transformer 5 can be further reduced in size.

Further, when DC power source 2 is used in the embodiment of FIG. 2, the DC voltage induced in secondary winding 5b is superposed on that from the DC power source 2, so that the number of turns in secondary winding 5b can be reduced.

Figure 3:
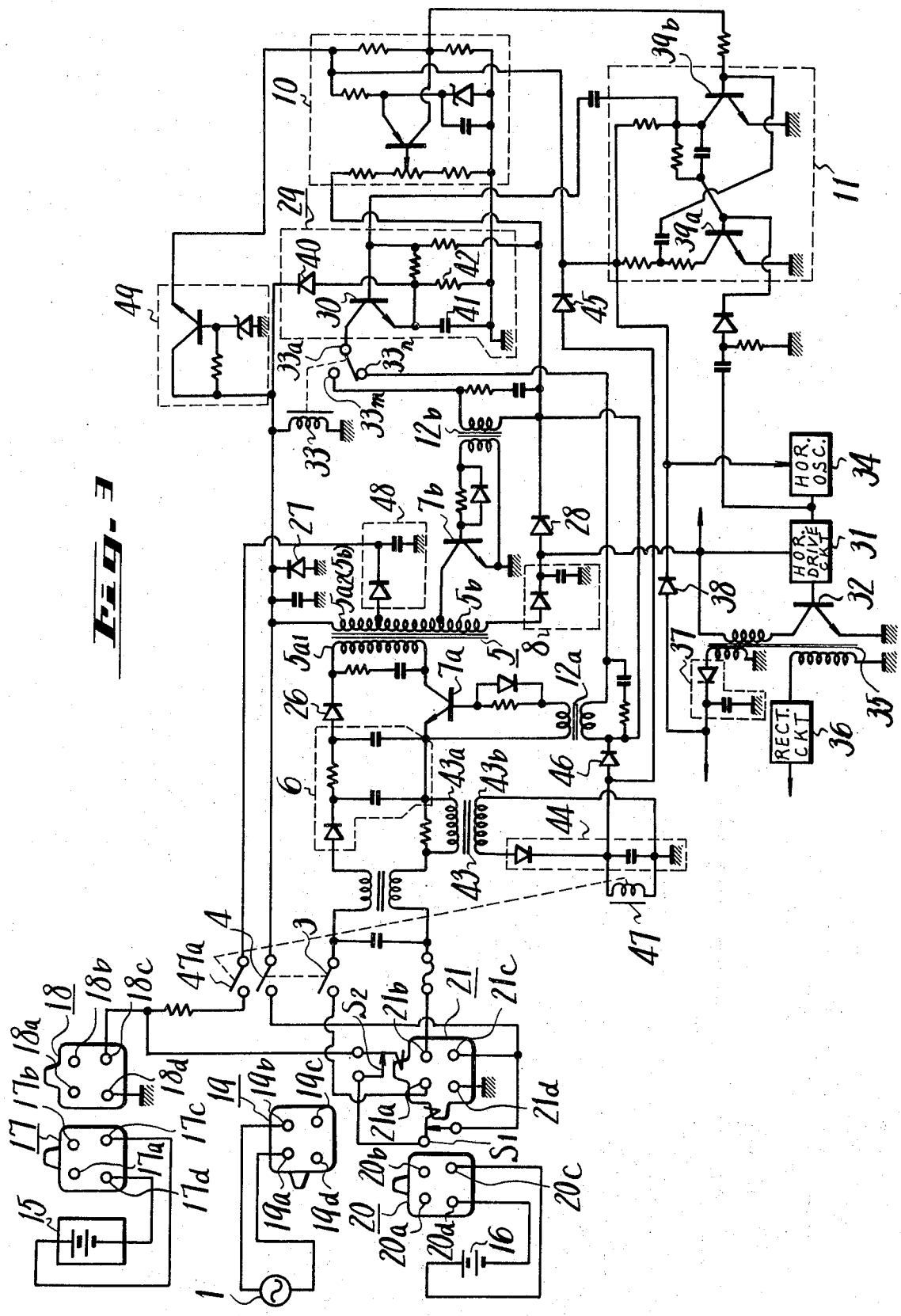
FIG. 3 shows still another embodiment of this invention as applied to a television receiver.

FIG. 3 shows an embodiment of a power supply circuit according to this invention applied to a television receiver and with which three different power sources, such as, an internal DC power source such as a rechargeable battery or the like provided in the television receiver, an external DC power source such as the battery of a car or the like, and an external AC power source such as a commercial AC line or the like, can be used.

In FIG. 3, elements corresponding to those described above with reference to FIGS. 1 and 2 are identified by the same reference numerals, and numeral 17 designates a plug to which an internal DC power source 15 is connected and numeral 18 identifies a socket into which the plug 17 may be inserted. Further, reference numeral 19 indicates a plug to which the external AC power source 1 is connected and reference numeral 20 identifies a plug to which an external DC power source 16 is connected. A selected one of the plugs 19 and 20 is inserted into a socket 21 in accordance with the kind of the power source to be used. Switches $S_1$ and $S_2$ mounted on or adjacent to socket 21 are each designed to be changed from a normal closed condition to an open condition when the plug 19 or 20, respectively, is inserted into the socket 21. The positive terminal of the internal DC power source 15 is connected to a connecting point 17c of plug 17, while the negative terminal of the DC power source 15 is connected to a connecting point 17d of plug 17. A connecting point 18d of socket 18 is grounded. The external AC power source 1 is connected between connecting points 19a and 19b of plug 19. The positive terminal of the external DC power source 16 is connected to a connecting point 20c of plug 20, while the negative terminal of DC power source 16 is connected to a connecting point 20d of plug 20.

When the internal DC power source 15 is used, plug 17 is inserted into socket 18 to connect the positive terminal of DC power source 15 to the primary winding $5a_2$ of converting transformer 5 through a connecting point 18c of socket 18, closed switches $S_2$ and $S_1$, and the power switch 4, so that transistor 7b performs its switching operation to convert the DC voltage to a pulsing or AC voltage as described above with respect to FIG. 2. The AC voltage is stepped up by the secondary winding 5b of transformer 5 and then applied to rectifier circuit 8.

When the external DC power source 16 is used, plug 20 is inserted into socket 21, and switch $S_2$ is opened. Thus, the positive terminal of the DC power source 16 is connected through a connecting point 21c of the socket 21 and power switch 4 to the primary winding $5a_2$ of transformer 5.

When the AC power source 1 is used, plug 19 is inserted into socket 21 and switch $S_1$ is opened. Thus, the AC voltage is fed through connecting points 21a and 21b of socket 21 and power switch 3 to rectifier circuit 6 where the AC voltage is converted to a DC voltage, which is then fed to primary winding $5a_1$ of transformer 5 through a diode 26 and transistor 7a. The transistor 7a then performs its switching operation to convert the DC voltage to an AC voltage which is stepped up in the secondary winding 5b of the transformer 5 and then applied to rectifier circuit 8. A stabilized DC voltage of, for example, 50 volts, can be obtained as an output from rectifier circuit 8.

If the plug 19 or 20 is inserted into socket 21 for using the external AC power source 1 or the external DC power source 16 at a time when the plug 17 is already inserted in the socket 18 for using the internal DC power source 15, the insertion of plug 19 or 20 opens switch $S_1$ or $S_2$, respectively, for disconnecting internal DC power source 15 from the load circuit so that useless power consumption of the internal DC power source 15 can be avoided.

During the supplying of DC power from source 15 or 16, that is, when transistor 7b performs its switching operation, the generation of AC voltage in the primary winding $5a_1$ of transformer 5 may give rise to the fear that rectifier circuit 6 and transistor 7a may become a load to consume power uselessly. However, by connecting diode 26 in series with the collector-base junction of transistor 7a, and by providing such diode and junction with opposed directions of conductivity, such useless power consumption can be avoided.

In the embodiment of FIG. 2, in order to ground the cold end of secondary winding 5b when the AC power source is used, selector switch 14 which is controlled by relay 13 is employed. However, in the embodiment of FIG. 3, the connection point between the supply line for the DC voltage extending from switch 4 and the cold end of secondary winding 5b is grounded through a diode 27 which has its polarity reversed in respect to that of the DC voltage to electronically achieve a switching operation similar to that of switch 14 in the power supply circuit of FIG. 2. More specifically, in the emmbodiment of FIG. 3, when AC power source 1 is used, diode 27 is biased in the forward direction for the load current flowing through rectifier circuit 8, so that diode 27 is made conductive with the result that the cold end of the secondary winding 5b is grounded in respect to AC and DC. Accordingly, a normal DC voltage is obtained as an output of rectifier circuit 8. On the other hand, when the DC power source 15 or 16 is used, diode 27 is reversely biased by the DC voltage from the DC power source and hence is made non-conductive, so that the cold end of secondary winding 5b is supplied with the DC voltage from the selected DC power source and a normal DC voltage, for example, a DC voltage of 50 volts, is obtained as the output of rectifier circuit 8 as in the case where the AC power source is used.

The DC voltage of 50 volts obtained as the output of rectifier circuit 8 is applied through a diode 28 and the primary winding of the driving transformer 12a or 12b to the collector electrode of a transistor 30 which forms part of a drive circuit 29. Further, the output of rectifier circuit 8 is supplied to a horizontal drive circuit 31, a horizontal output transistor 32 and other load circuits of the television receiver. A relay 33 is provided to determine which one of the driving transformers 12 and 12b is connected to drive circuit 29. The relay 33 is energized only when the internal or external DC power source 15 or 16 is used and switch 4 is closed. In this case, the movable contact 33a of relay 33 engages the contact 33m to apply the driving pulse only to the transistor 7b through the respective transformer 12b. When the AC power source 1 is used, the movable contact 33a engages the contact 33n to apply the driving pulse only to the transistor 7a through the respective transformer 12a.

In FIG. 3, the television receiver is further shown to include a horizontal oscillator 34, a flyback transformer 35, a high voltage rectifier circuit 36 which may apply a high voltage to the anode of a cathode ray tube (not shown), and a low voltage rectifier circuit 37.

The low DC voltage, for example, of 18 volts, derived from low voltage rectifier circuit 37 is applied through a diode 38 to horizontal oscillator 34, the pulse duration modulator or oscillator 11, the error amplifier 10, and other components of the receiver, such as, a tuner (not shown). The output from horizontal oscillator 34 is applied to the horizontal drive circuit 31, where it is differentiated and then applied to the base electrode of a transistor 39a which, together with a transistor 39b forms a monostable multivibrator of the pulse duration modulator 11. Thus, the pulse duration modulator 11 is triggered at the horizontal period. The base electrode of transistor 39b in pulse duration modulator 11 is supplied with an error voltage from error amplifier 10 to control the pulse duration in response to the error voltage. The output pulse from pulse duration modulator 11 is applied through drive circuit 29 to either the driving transformer 12a or 12b to drive the transistor 7a or 7b, respectively. A parallel circuit of a capacitor 41 and a resistor 42 is connected between the emitter electrode of transistor 30 and the ground drive circuit 29, so that transistor 7b can be positively driven to achieve its switching operation even during the transient conditions immediately after power switch 4 is closed when commencing use of the DC power source 15 or 16.

If transistor 7b does not perform its switching operation immediately after switch 4 is closed, the DC voltage of DC power source 15 or 16 appears as is at rectifier circuit 8. In that case, the collector electrode of transistor 30 will not be supplied with sufficient voltage and hence transistor 7b will not be supplied with a driving pulse of sufficient amplitude. If the driving pulse supplied to transistor 7b is low in amplitude, so that transistor 7b cannot perform its switching operation completely, it is possible that the transistor 7b may be damaged.

However, in the embodiment of this invention shown in FIG. 3, the parallel circuit of capacitor 41 and resistor 42 connected between the emitter electrode of transistor 30 and the ground, serves to clamp the emitter of the transistor 30 at the ground potential immediately after power switch 4 is closed and the potential difference between the collector and emitter electrodes of transistor 30 increases. Thus, it becomes possible to apply a sufficient driving pulse to the transistor 7b immediately after closing of switch 4. Thereafter, that is, under normal conditions the emitter electrode of transistor 30 is kept at a predetermined voltage in response to the current flowing through transistor 30 which also flows through resistor 42.

Figure 4A:
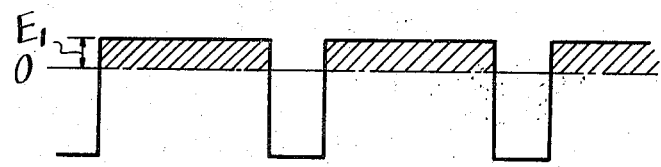
FIGS. 4A and 4B show waveform diagrams to which reference will be made in explaining operation of the power supply circuit shown in FIG. 3.
Figure 4B:
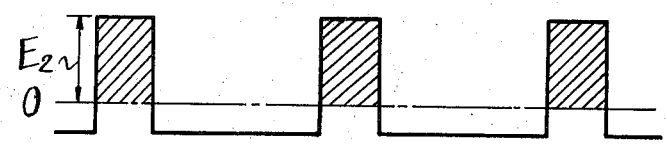

Further, as shown, a diode 40 is connected between the DC power supply line and the emitter electrode of transistor 30. By reason of such diode 40, even if the DC voltage of the DC power source 15 or 16 is changed greatly, the pulse duration modulator 11 can be operative to achieve voltage stabilization, as follows:

If the DC voltage of the DC power source 15 or 16 is decreased, the output pulse from pulse duration modulator 11 varies to increase the on-duration of transistor 7b. However, since the driving pulse is applied through driving transformer 12b to transistor 7b, the DC component of the driving pulse is not transmitted thereto. In the absence of diode 40, in the case where a pulse of long duration is generated in transistor 30, the voltage $E_1$ of the positive portion (indicated by the hatched areas in FIG. 4A) of a pulse generated in the secondary winding of driving transformer 12b becomes low as compared with the voltage $E_2$ of the positive portion (indicated by the hatched areas in FIG. 4B) of a pulse generated in the secondary winding of driving transformer 12b when the duration of the driving pulse from transistor 30 is short. As a result, it would become impossible to make the transistor 7b completely conductive and the duration of the driving pulse would not be proportional to the DC voltage derived from rectifier circuit 8, so that it would be impossible to achieve perfect voltage stabilization.

However, since the DC voltage supply line is connected through diode 40 to emitter electrode of transistor 30, in accordance with this invention, the emitter potential of transistor 30 varies in accordance with any change in the DC voltage of the DC power source 15 or 16. The emitter potential of transistor 30 is selected so that the diode 40 is conductive in the normal state.

If the DC voltage of DC power source 15 or 16 is lowered, the duration of the driving pulse generated in transistor 30 is increased, as described above, and hence the on-duration of transistor 7b is similarly increased. At the same time, the emitter potential of transistor 30 is lowered to increase the potential difference between its collector and emitter electrodes, and hence to increase the amplitude of the driving pulse. Accordingly, the transistor 7b is controlled not only by the duration of the driving pulse but also by its amplitude to thereby achieve perfect voltage stabilizing operation.

In the embodiment of FIG. 3, the operating voltage for error amplifier 10, pulse duration modulator 11, horizontal oscillator 34 and the like normally is derived from low voltage rectifier circuit 37 connected to the flyback transformer 35, as described above, so that it is necessary to provide some means for temporarily applying an operating voltage to such circuits for starting their operation.

When the AC power source 1 is used, an auxiliary transformer 43 is employed as the above starting means. More specifically, as shown, a primary winding 43a of transformer 43 is connected in series in a current flow path of the AC power source, while a secondary winding 43b of such transformer is grounded at one end and connected, at the other end, to a rectifier circuit 44. The output of rectifier circuit 44 is applied through a diode 45 to error amplifier 10, pulse duration modulator 11 and horizontal oscillator 34. The output of rectifier circuit 4 is also applied through a diode 46 and driving transformer 12a or 12b to the collector electrode of transistor 30. When the power switch 3 is closed, a rush or current flows, mainly by way of a capacitor of rectifier circuit 6 to primary winding 43a of transformer 43 to transiently induce a voltage in its secondary winding 43b. Such induced voltage is rectified by rectifier circuit 44 to provide a DC voltage which is then applied to horizontal oscillator 34, error amplifier 10 and so on. As a result, horizontal oscillator 34 starts its oscillation to drive the horizontal drive circuit 31 and also to trigger pulse duration modulator 11. Since pulse duration modulator 11, upon being thus triggered, applies the pulse signal to transistor 30, transistor 30 carries out the switching operation for supplying a driving pulse to transistor 7a. After transistor 7a has once performed its switching operation, the normal DC voltage, for example, the DC voltage of 50 volts, appears at the output of rectifier circuit 8. Accordingly, horizontal drive circuit 31 and horizontal output transistor 32 carry out their normal operations, and hence the normal relatively low DC voltage, for example, the DC voltage of 18 volts appears at the output of low voltage rectifier 37. Thus, even if rectifier circuit 44 produces no voltage, transistor 7a performs its switching operation continuously. The diodes 28 and 38 ensure that the transient DC voltage from rectifier circuit 44 will not be consumed uselessly in rectifier circuits 8 and 37. The diode 46 ensures that, when the output from rectifier circuit 8 attains the normal voltage, the rectifier circuit 44 will not become a useless load for rectifier circuit 8. Further, in the embodiment shown in FIG. 3, since the voltage for starting is obtained through transformer 43 when the AC power source 1 is used, such AC power source is electrically isolated from the various load circuits so that an operator is protected from electric shock.

The starting means, when the DC power source 15 or 16 is used, is shown on FIG. 3 to include a voltage limiter 49 through which the DC voltage supply line is connected to error amplifier 10, pulse duration modulator 11 and horizontal oscillator 34. When power switch 4 is closed, the voltage from the DC power source 15 or 16 is impressed through voltage limiter 49 on horizontal oscillator 34 and so on. Thus, the circuits operate in a manner similar to that described above for the case of using the AC power source 1, but now transistor 7b starts its switching operation instead of transistor 7a. As the output voltage from low voltage rectifier circuit 37 increases to a normal level, the transistor in voltage limiter 49 is made non-conductive with the result that thereafter all of the operating voltages for horizontal oscillator 34 and so on are obtained from rectifier circuit 37.

It may be possible to employ a diode instead of voltage limiter 49, but such voltage limiter is preferred so as to avoid the application of an abnormal high voltage on the horizontal oscillator 34 and so on.

In the power supply circuit according to this invention, as shown on FIG. 3, a charging circuit is also provided for charging the internal DC power source or battey 15 when AC power source 1 is being used. More specifically, a rectifier circuit 48 for charging is connected to a mid tap of the secondary winding 5b of converting transformer 5. The output terminal of rectifier circuit 48 is connected to a connecting point 18c of socket 18 through a switch 47a controlled by a relay 47 which is, in turn, connected to the output terminal of rectifier circuit 44. When the AC power source 1 is used, the AC component of the current flowing through primary winding 43a of the auxiliary transformer 43 causes the generation of a voltage, which is lower than the voltage for starting, but sufficient for actuating relay 47 by way of rectifier circuit 44. Accordingly, relay actuated switch 47a is closed to supply the voltage derived from rectifier circuit 48 to the battery constituting the internal DC power source 15 and hence to charge the battery.

Further, in the embodiment of FIG. 3, the switching transistors 7a and 7b are switched at the horizontal frequency of the associated television receiver, so that the converting transformer 5 can be reduced in size.

It will be apparent to those skilled in the art that many changes and variations can be effected in the above described embodiments of the invention without departing from the spirit and scope of the novel concepts of the invention, as defined in the appended claims.

We claim as our invention:

1. A DC power supply circuit of the switching type comprising:
   a. a transformer having a first primary winding, a second primary winding and a secondary winding;
   b. a first series circuit connected to said first primary winding and including rectifier means and first switching means;
   c. a first input terminal adapted to be connected to an AC power source for selectively supplying an input voltage to said first series circuit;
   d. a second series circuit connected to said second primary winding and including second switching means;
   e. a second input terminal adapted to be connected to a DC power source for selectively supplying an input voltage to said second series circuit;
   f. driving means for supplying a switching signal to at least one of said first and second switching means to intermittently interrupt at least one of said first and second series circuits such that the current flowing through a corresponding one of said first and second primary windings is intermittently interrupted so as to induce a voltage across said secondary winding; and
   g. output rectifier means connected to said secondary winding for rectifying said induced voltage and for producing an output DC voltage.

2. A power supply circuit according to claim 1 wherein said secondary winding is isolated from said first primary winding.

3. A power supply circuit according to claim 2 including drive transformer means for supplying said switching signal from said driving means to at least said one switching means.

4. A power supply circuit according to claim 1 wherein said second primary winding is formed from a portion of said secondary winding.

5. A power supply circuit according to claim 4 including selector switch means for selectively connecting one end of said secondary winding to ground when said AC power source is connected to said first input terminal and to said DC power source when said DC power source is connected to said second input terminal.

6. A power supply circuit according to claim 1 wherein said driving means comprises pulse duration modulator means responsive to said DC output voltage for generating switching pulses having a duration dependent upon the difference between said DC output voltage and a predetermined value and means for supplying the output of said pulse duration modulator means to said switching means to thereby vary the duration that said switching means is closed in accordance with said switching pulse duration for stabilizing said DC output voltage.

7. A power supply circuit according to claim 6 further comprising error amplifier means coupled to said output rectifier means for applying a control signal to said pulse duration modulator means proportional to the deviation of said DC output voltage from said predetermined value.

8. A power supply circuit according to claim 1 further including an auxiliary transformer having a primary winding connected in series with said first series circuit and a secondary winding coupled to said driving means, said auxiliary transformer being responsive to an initial application of AC voltage to said first series circuit to induce a transient voltage at said secondary winding thereof, said transient voltage being supplied to said driving means as an operating voltage.

9. A power supply circuit according to claim 1 wherein said driving means includes selector means for supplying said switching signal to said first switching means when said AC power source is connected to said first input terminal and to said second switching means when said DC power source is connected to said second input terminal.

10. A power supply circuit according to claim 4 further including a diode for connecting one end of said second primary winding to ground.

11. A DC power supply circuit of the switching type for supplying an electrical apparatus with a stabilized DC voltage of substantially constant amplitude in response to energization by an AC power input source or a DC power input source, comprising:
   a transformer having a first primary winding, a second primary winding and a secondary winding;
   a first series circuit connected to said first primary winding and including input rectifier means and first switching means;
   first input means adapted to connect an AC power source to said first series circuit for supplying an AC voltage to said first series circuit;
   a second series circuit connected to said second primary winding and including second switching means;

second input means adapted to connect a DC power source to said second series circuit for supplying a DC voltage to said second series circuit, said first and second input means being mutually exclusive in supplying the respective voltages to the respective series circuits;

pulse generating means operable at a frequency determined by the operation of said electrical apparatus for supplying switching signals of variable duration to at least one of said first and second switching means to thereby intermittently energize at least said one switching means for a corresponding duration and at said frequency such that current flows intermittently through the respective one of said first and second primary windings for substantially said duration;

output rectifier means connected to said transformer secondary winding for rectifying a voltage induced across said secondary winding and for generating an output DC supply voltage;

detecting means coupled to said output rectifier means for detecting the deviation of said output DC supply voltage from a predetermined value and for generating a control signal proportional to said deviation; and means for applying said control signal to said pulse generating means so that said control signal determines said duration of said switching signals.

12. A power supply circuit in accordance with claim 11 wherein said first input means includes a first power switch connected to said first series circuit and first connector means coupled to said first power switch for being supplied with said AC power source.

13. A power supply circuit in accordance with claim 12 wherein said DC power source comprises a rechargeable battery connected to second connector means, and wherein said second input means comprises a second power switch connected to said second series circuit and further connected to said first connector means; a DC selector switch assuming a normally closed state to connect said second connector means to said second power switch; and means for coupling an external DC supply to said first connector means and for simultaneously opening said normally closed DC selector switch to thereby couple said external DC supply to said second power switch.

14. A power supply circuit in accordance with claim 11 wherein said pulse generating means includes amplifying means for receiving said switching signals; and selector switch means coupled to said amplifying means and responsive to DC voltage applied to said second series circuit for connecting said amplifying means to said second switching means and responsive to the absence of DC voltage applied to said second series circuit for connecting said amplifying means to said first switching means.

15. A power supply circuit in accordance with claim 14 wherein said second primary winding consists of a portion of said secondary winding; and wherein one end of said secondary winding is connected to said output rectifier means and the other end of said secondary winding is common to said second primary winding and is selectively coupled to ground by selective switching means such that said other end is coupled to ground when said AC power source is connected to said first series circuit and said other end is supplied with DC voltage when a DC power source is connected to said second series circuit.

16. A power supply circuit in accordance with claim 11 wherein said DC power source comprises a rechargeable battery and wherein said power supply system further includes charging means for recharging said battery when said AC power source is connected to said first series circuit.

17. A power supply circuit in accordance with claim 16 wherein said charging means comprises charging current rectifier means connected to a mid-tap of said transformer secondary winding for producing a DC charging current; AC sensing means included in said first series circuit for detecting when said AC power source is connected to said first series circuit; and selective coupling means responsive to said AC sensing means for coupling said DC charging current to said rechargeable battery.

18. A power supply circuit in accordance with claim 11 further including start-up means for temporarily supplying operating voltages to at least said pulse generating means and said detecting means when said AC power source or a DC power source is initially connected to said first or second series circuits, respectively.

19. A power supply circuit in accordance with claim 18 wherein said start-up means comprises an auxiliary transformer connected in said first series circuit and responsive to a transient voltage applied thereto when said AC power source is initially connected to said first series circuit; transient voltage rectifier means for rectifying the voltage induced across said auxiliary transformer to a DC voltage; means for supplying said last-mentioned DC voltage to at least said pulse generating means and said detecting means; and means for preventing the application of said last-mentioned DC voltage to said output rectifier means.

20. A power supply circuit in accordance with claim 19 wherein said start-up means further comprises voltage limiting means having an input terminal connected to said second input means for detecting when a DC source is connected thereto, and an output terminal coupled to at least said pulse generating means and said detecting means, said voltage limiting means being conductive when a DC power source is initially connected to said second series circuit; and means for rendering said voltage limiting means nonconductive when said output DC supply voltage reaches a substantially steady-state level.

* * * * *

UNITED STATES PATENT OFFICE
CERTIFICATE OF CORRECTION

Patent No. 3,873,846      Dated March 25, 1975

Inventor(s) Minoru Morio and Fumio Otaki

It is certified that error appears in the above-identified patent and that said Letters Patent are hereby corrected as shown below:

In the heading, please change

(30) Foreign Application Priority Data

Sept. 7, 1972      Japan..............47-104703

Sept. 7, 1972      Japan..............47-105820

Sept. 7, 1972      Japan..............47-107959 to

Sept. 7, 1972      Japan..............47-104703

Sept. 11, 1972      Japan..............47-105820

Sept. 16, 1972      Japan..............47-107959

*Signed and Sealed this*

*twenty-third* Day of *December 1975*

[SEAL]

Attest:

RUTH C. MASON
*Attesting Officer*

C. MARSHALL DANN
*Commissioner of Patents and Trademarks*